United States Patent [19]
Shikichi et al.

[11] Patent Number: 4,888,756
[45] Date of Patent: Dec. 19, 1989

[54] OPTICAL INFORMATION RECORDING AND REPRODUCING APPARATUS

[75] Inventors: Satoshi Shikichi, Tokyo; Hideki Hosoya, Kawasaki, both of Japan

[73] Assignee: Canon Kabushiki Kaisha, Tokyo, Japan

[21] Appl. No.: 291,368

[22] Filed: Dec. 30, 1988

Related U.S. Application Data

[63] Continuation of Ser. No. 49,567, May 14, 1987, abandoned.

[30] Foreign Application Priority Data

May 20, 1986 [JP] Japan ................... 61-113511
May 20, 1986 [JP] Japan ................... 61-113512

[51] Int. Cl.$^4$ ................................ G11B 7/00
[52] U.S. Cl. ........................ 369/45; 369/46; 369/124
[58] Field of Search .............. 235/470, 477; 360/2; 369/32, 44–46, 124; 358/342

[56] References Cited

U.S. PATENT DOCUMENTS

| | | |
|---|---|---|
| 3,474,418 | 10/1969 | Jensen . |
| 4,344,165 | 8/1982 | Akiyama ................... 369/44 |
| 4,536,864 | 8/1985 | Van Rosmalen ........... 369/44 |
| 4,562,562 | 12/1985 | Moriya et al. ............. 369/44 |
| 4,567,533 | 1/1986 | Assink ....................... 358/342 |
| 4,598,393 | 7/1986 | Pierce et al. ............... 369/46 |
| 4,611,317 | 9/1986 | Takeuchi et al. .......... 369/45 |
| 4,634,850 | 1/1987 | Pierce et al. ............... 235/487 |
| 4,688,203 | 8/1987 | Koishi et al. .............. 369/48 |
| 4,734,565 | 3/1988 | Pierce et al. ............... 235/454 |
| 4,751,394 | 6/1988 | Matsuoka et al. ......... 250/561 |

FOREIGN PATENT DOCUMENTS 85-01818 4/1985 PCT Int'l Appl. .
2171551 8/1986 United Kingdom .

OTHER PUBLICATIONS

Drexon Laser Memory Card Quarterly Report, No. 5, 1/1985, pp. 1–24.
Drexon Laser Memory Card Final Report, 07/1986, pp. 6-1 to 6-20.

Primary Examiner—Donald McElheny, Jr.
Attorney, Agent, or Firm—Fitzpatrick, Cella, Harper & Scinto

[57] ABSTRACT

An optical information recording and reproducing apparatus for an optical information record medium on which a plurality of tracks are arranged substantially in parallel, comprises a light source, a first optical system for guiding a light beam from the light source, onto the record medium, a second optical system for obtaining the light beam from the record medium, a detecting device for receiving the light beam obtained by the second optical system to output at least one of a focusing signal and a tracking signal, an adjusting device for adjusting at least one of focusing and tracking operation in accordance with at least one of the focusing and tracking signals, a reciprocating device for causing the record medium to reciprocate, a control device for controlling the reciprocating device, and a change device for changing at least a servo gain of the adjusting device in accordance with at least a signal from the control device.

38 Claims, 5 Drawing Sheets

OPTICAL INFORMATION RECORDING AND REPRODUCING APPARATUS

This is a continuation of Ser. No. 049,567, filed 5/14/87, now abandoned.

BACKGROUND OF THE INVENTION

1. Field of the Invention

The present invention relates to an optical information recording and reproducing apparatus for recording information on an optical information recording medium, reproducing the information recorded on the medium and/or erasing the information recorded on the medium. Such an information recording and reproducing apparatus is suitably used as an information recording and reproducing apparatus which uses a card-like information recording medium on which a plurality of linear information tracks are arranged in parallel.

2. Related Background Art

As a medium for recording information by using a light and reading the information thus recorded, disk-shaped, card-shaped and tape-shaped media have been known. Of those, the card-shaped optical information recording medium (hereinafter referred to as an optical card) is compact and light in weight, convenient to carry and has a large memory capacity. Accordingly, a big demand is expected.

Figure 1:
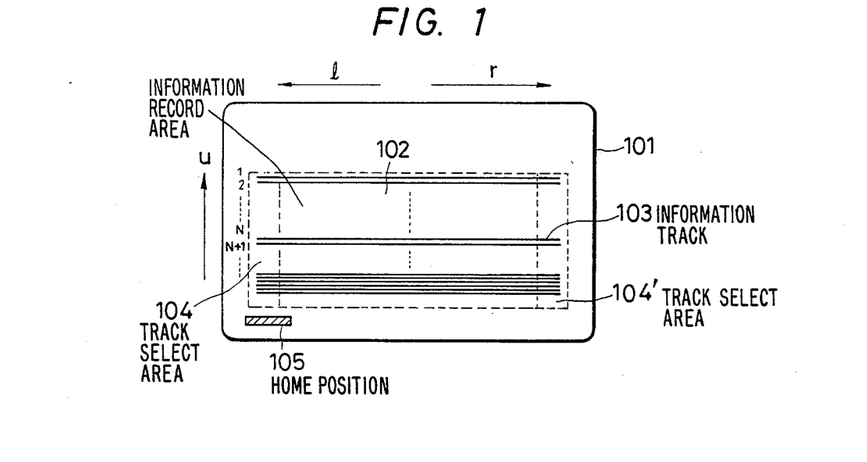
FIG. 1 shows a plan view of an optical card.

FIG. 1 shows a plan view of such an optical card 101. Numeral 102 denotes an information record area, numeral 103 denotes an information track, numerals 104 and 104' denote track select area, and numeral 105 denote a home position of a light beam spot.

On the optical card, information is recorded as a line of optically detectable record bits (information track) by scanning the card by a light beam which is modulated by recording information and focused into a small spot. In order to exactly record information without trouble such as crossing of information tracks, it is necessary to control (autotracking or AT) an irradiation position of the light beam spot on the optical card in a direction normal to a scan direction. In order to irradiate the light beam as a stable small spot irrespective of curvature of the optical card or mechanical tolerance, it is necessary to control (auto-focusing or AF) the light beam spot in a direction normal to the optical card surface. Further, the AT and AF are required in the reproduce mode.

Figure 2:
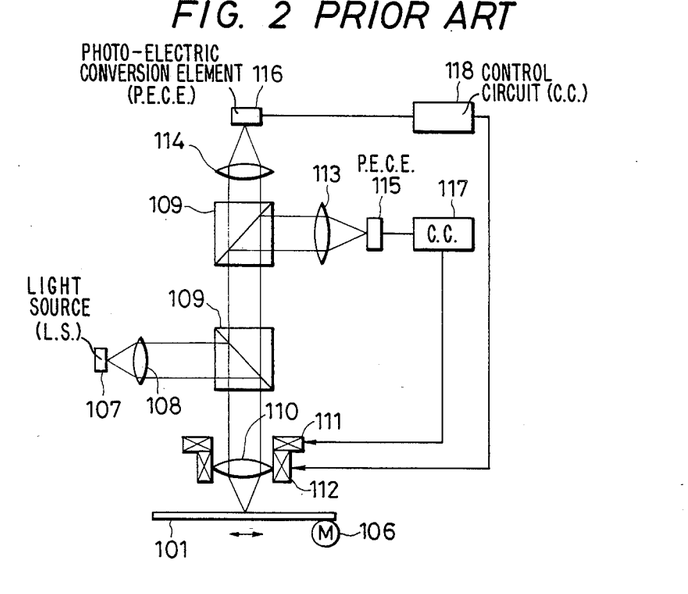
FIG. 2 shows a configuration of a prior art optical card recording and reproducing apparatus.

FIG. 2 shows a configuration of an apparatus for recording and reproducing information to and from the optical card. Numeral 106 denotes a motor for driving the optical card 101 in a direction of arrow, numeral 107 denotes a light source such as a semiconductor laser, numeral 108 denotes a collimeter lens, numeral 109 denotes a beam splitter, numeral 110 denotes an objective lens, numeral 111 denotes a tracking coil, numeral 112 denotes a focusing coil, numerals 113 and 114 denote condenser lenses, numerals 115 and 116 denote photo-electric conversion elements, numeral 117 denotes a tracking control circuit and numeral 118 denotes a focusing control circuit. Currents are supplied to the tracking coil 111 and focusing coil 112 by commands from the control circuits 117 and 118 in accordance with tracking signal and focusing signal detected by the photo-electric conversion elements 115 and 116 so that the objective lens 110 is driven to effect the AT and AF.

A method for recording and reproducing information is explained with reference to FIGS. 1 and 2. The light beam spot is initially at the home position 105. The light beam spot them moves on the track select area 104 in a direction u to find a record or reproduce track N, when the AT and AF are effected and the N is scanned in a direction r to record or reproduce information. When the light beam spot comes into the track select area 104', a large current is momentarily supplied to the tracking coil 111 (FIG. 2) so that the light beam spot is kicked to the track (N+1). Then, the track (N+1) is scanned in the reverse direction 1 to record or reproduce information. Depending on amount of information, the scan of the information track 103 by the light beam spot and the kick of the light beam spot in the track select areas 104 and 104' are repeated several times.

In such an information recording and reproducing apparatus, when the optical card 101 is reciprocally driven by the motor 106, vibration is generated in the directions of AT and AF, because the light beam spot may be off-tracked in the direction of AT from the information track due to skew of the information track relative to the contour of the optical card and a backlash of the optical card drive mechanism and the AT control attempts to compensate for such off-track. On the other hand, in the direction of AF, the light beam spot may be defocused from the record plane of the optical card due to curvature of the optical card and the backlash of the optical card drive mechanism, and the AF control attempts to compensate it.

Figure 3:
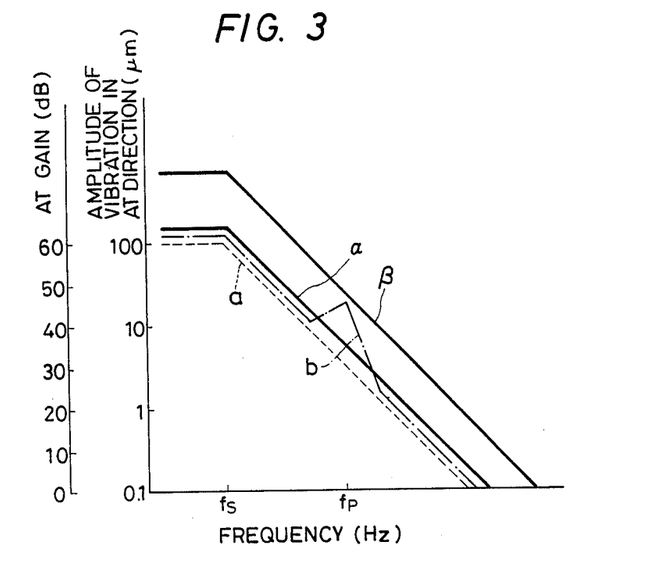
FIGS. 3, 4, 7, 9, and 10 show graphs of amplitudes of vibration in AT direction and AT servo gains.

It has been known that the amplitude of such vibration depends on a frequency. FIG. 3 illustrates such frequency dependency. It shows the dependency in the AT direction. It is assumed that the skew is ±100 μm. Assuming that the vibration in the AT direction is generated merely by the skew, the frequency dependency of the amplitude of the vibration in the AT direction is represented by a, at a frequency up to a reciprocation frequency fs when the light beam spot scans, the amplitude is flat at 100 μm, and above the frequency fs, the amplitude decreases at a rate of −12 dB/oct. In order to keep the deviation in the AT within ±0.1 μm, an open loop gain $G_T$ of the AT servo at the frequency below the scan frequency ts is $$G_T = 20 \log (100/0.1) = 60 \text{ dB}$$

as shown by α in FIG. 3, and it decreases at the rate of −12 dB/oct at the frequency above the scan frequency.

However, the vibration in the AT direction is caused not only by the skew but also by the reversal of the reciprocal movement of the optical card. Such vibration occurs at a resonant frequency fp (fs<fp). This is due to mechanical vibration of the drive mechanism by abrupt deceleration and abrupt opposite acceleration upon the reversal of the reciprocal movement of the optical card. The vibration in the AT direction including the vibration at the reversal is represented by b in FIG. 3. In order to keep the deviation of AT within ±0.1 μm under the vibration at the reversal, the AT gain is raised as shown by β in FIG. 3.

As a result, the AT is sufficiently attained at the reversal. However, at a time other than the reversal, the AT gain is higher than required, particularly in a high frequency band. Accordingly, the AT servo system is sensitive to a fine defect or dust on the surface of the optical card. This causes degradation of recorded or reproduced signal.

The same is true for the AF direction.

In the information recording and reproducing apparatus described above, the scan speed of the light beam spot in the γ direction and l direction differs between the record mode and the reproduce mode. In the record mode, a relatively low scan speed is selected by the limitation such as record sensitivity of the record medium. Thus, the speed $V_W$ in the record mode is lower than a speed $V_R$ in the reproduce mode ($V_W<V_R$). Since the scan distance in the record mode is equal to the scan distance in the reproduce mode, a frequency $f_w$ of the reciprocation in the scan in the record mode is lower than a scan frequency $f_R$ in the reproduce mode ($f_W<f_R$).

Figure 4:
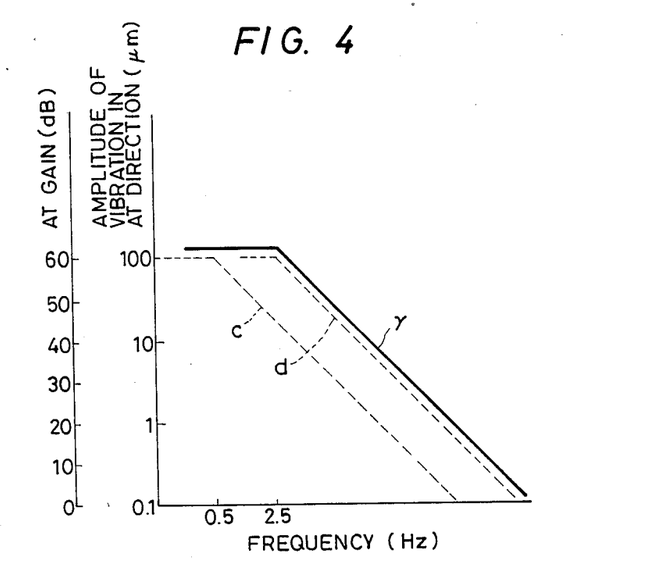

On the other hand, in the information recording and reproducing apparatus described above, when the optical card 101 is reciprocally driven by the motor 106, vibrations are generated in the AT and AF directions. It has been known that the amplitude of the vibration depends on the frequency of the vibration. FIG. 4 illustrates such frequency dependency. It shows the dependency in the AT direction. It is assumed that a recording scan frequency $f_W$ is 0.5 Hz, a reproducing scan frequency $f_R$ is 2.5 Hz and a skew is ±100 μm. Assuming that the vibration in the AT direction is generated merely by the skew, the frequency dependency of the amplitude of the vibration in the AT direction in the record mode is represented by c. The amplitude is flat at 100 μm at a frequency up to the recording scan frequency 0.5 Hz, and it decreases at a rate of −12 dB/oct at a frequency above the scan frequency. On the other hand, the frequency dependency of the amplitude in the AT direction in the reproduce mode is represented by d. The amplitude is flat at 100 μm at a frequency up to the reproducing scan frequency 2.5 Hz, and it decreases at a rate of −12 dB/oct at a frequency above the scan frequency.

In order to keep the deviation of AT within ±0.1 μm in both the record mode and the reproduce mode, the open loop gain $G_T$ of the AT servo is set as shown by a in FIG. 4. Namely, at a frequency below the reproducing scan frequency 2.5 Hz, $$G_T = 20 \log(100/0.1) = 60 \text{ dB}$$

and it decreases at a rate of −12 dB/oct at a frequency above the scan frequency.

As a result, sufficient AT control is effected in both the record mode and the reproduce mode. However, in the record mode, since the AT gain in a high frequency band is higher than required, the AT servo system is sensitive to a fine defect or dust on the surface of the optical card. This causes degradation of a recorded signal.

The same applies to the AF direction.

SUMMARY OF THE INVENTION

It is an object of the present invention to provide an optical information recording and reproducing apparatus which resolves the problems encountered in the prior art apparatus, does not cause degradation of recorded and reproduced signals by the affect of defect or dust on the surface of the recording medium, does not cause off-AT or off-AF, and improves reliability and an error rate.

In order to achieve the above object, in accordance with the present invention, a light beam spot is reciprocally moved relative to an information track on the optical information recording medium while it is tracked and/or focused to record information on the recording medium, reproduce the information recorded on the recording medium and/or erase the information recorded on the recording medium. The direction and/or speed of the reciprocal movement are switched, and the tracking servo gain and/or focusing servo gain are switched by control means.

DESCRIPTION OF THE PREFERRED EMBODIMENTS

Figure 5:
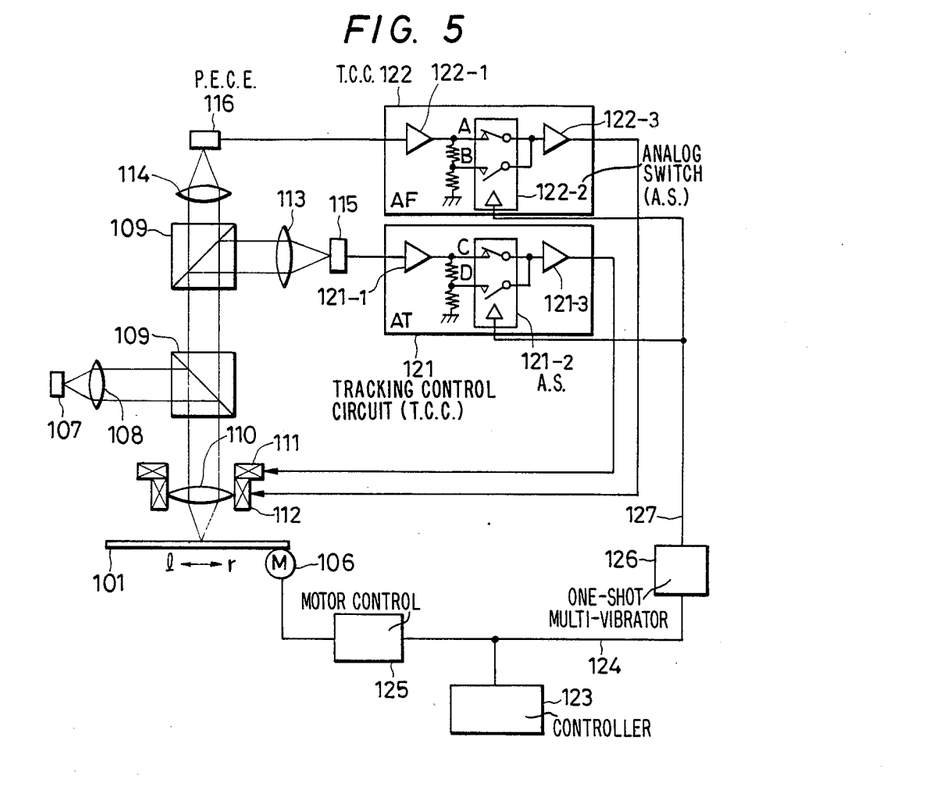
FIG. 5 shows a configuration of an optical card recording and reproducing apparatus of the present invention.

FIG. 5 shows a configuration of an optical card recording and reproducing apparatus which is the optical information recording and reproducing apparatus of the present invention. The like elements to those shown in FIG. 2 are designated by the like numerals, and the explanation thereof is omitted.

In FIG. 5, numerals 121 and 122 denote a tracking control circuit and a focusing control circuit, respectively. In the tracking control circuit 121, numeral 121-1 denotes an amplifier which amplifies an electrical tracking signal supplied from a photoelectric conversion element 115 to an appropriate voltage Numeral 121-2 denotes an analog switch. Signal is supplied from the amplifier 121-1 through terminals C and D. Numeral 121-3 denotes a driver which receives the signal from the analog switch 121-2 to supply a drive signal current to a tracking coil 111. In the focusing control circuit 122, numeral 122-1 denotes an amplifier which amplifies an electrical focusing signal supplied from a photo-electric conversion element 116 to an appropriate voltage. Numeral 122-2 denotes an analog switch. The signal from the amplifier 122-1 is supplied thereto through terminals A and B. Numeral 122-3 denotes a driver which receives the signal from the analog switch 122-2 to supply a drive signal current to the focusing coil 112.

Figure 6:
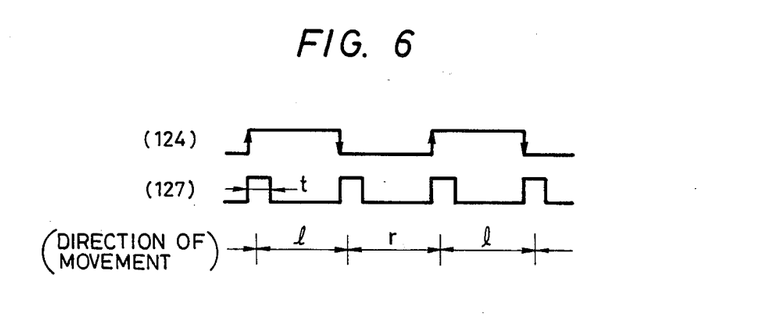
FIG. 6 shows a signal time chart.

In FIG. 5, numeral 123 denotes a system controller which controls the recording and reproducing apparatus, and numeral 124 denotes a signal produced by the controller to control the direction of movement of the optical card (i.e., the direction of rotation of a motor 106). The controller 123 also produces other signals than 124 although they are not shown. Numeral 125 denotes a motor driver which receives the signal 124 to control the direction of rotation of the motor 106. Numeral 126 denotes a one-shot multivibrator which receives the signal 124 to produce a signal 127 when the signal 124 transits. FIG. 6 shows a time chart showing a relation between the signals 124 and 127. When the signal 124 changes from an L level to an H level and from the H level to the L level, pulse signals 127 having a width t are produced. In FIGS. 5 and 6, l and γ represent the directions of movement of the optical card 101 by the motor 106 in accordance with the signal 124. As shown, the reversal of the direction of movement of the optical card is effected within a time period of the pulse width t of the signal 127. The motor controller 125 starts the deceleration when the level of the signal 124 changes, stops the deceleration at the mid-point of the time period t, starts the acceleration in the opposite direction, and drives the motor at a steady speed at the mid-point of the time period t.

The signal 127 is applied to the analog switches 121-2 and 122-2, which control the status of the switches. When the pulse signal 127 is present (reversal), the terminal C of the switch 121-2 is closed and the terminal D is open. In the switch 122-2, the terminal A is closed and the terminal B is open. On the other hand, when the pulse signal 127 is not present (non-reversal), the terminal C of the switch 121-2 is open and the terminal D is closed. In the switch 122-2, the terminal A is open and the terminal B is closed. Accordingly, at the non-reversal time, the outputs from the amplifiers 121-1 and 122-1 are divided and they are supplied to the drivers 121-3 and 122-3, respectively. On the other hand, at the reversal time, the output voltages from the amplifiers 121-1 and 122-1 are not divided and supplied to the drivers 121-3 and 122-3, respectively. Thus, the AT gain and AF gain at the reversal time can be higher than those at the nonreversal time.

Figure 7:
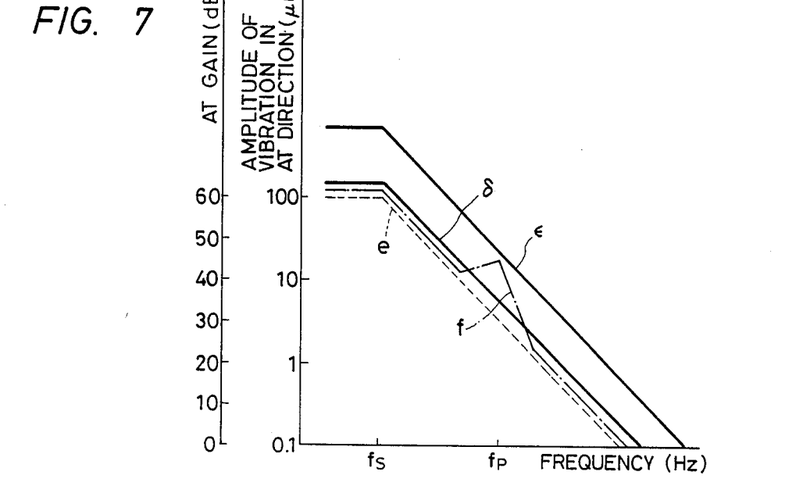

In FIG. 7, e shows the vibration in the AT direction only at the non-reversal time, and f shows the vibration in the AT direction including the reversal time. They are similar to a and b shown in FIG. 3, respectively. In the present embodiment, the AT gain is set to assume $\epsilon$ shown in FIG. 7 at the reversal time (that is, when the output from the amplifier 121-1 is applied to the driver 121-3 through the terminal C). At the non-reversal time, the output from the amplifier 121-1 is supplied to the driver 121-3 through the terminal D and the AT gain assumes $\delta$ shown in FIG. 7 which is a shift-down version of $\epsilon$. The $\delta$ may be set to be equal to $\alpha$ shown in FIG. 3 by appropriately selecting a resistance between the terminals C and D and other constants.

Thus, at the non-reversal time, the degradation of the recorded and reproduced signals due to oversensitivity by the overgain is prevented. At the reversal time, sufficient AT and AF are attained even under a large high frequency vibration. At the reversal time, information is not recorded or reproduced and hence the signal is not degraded.

Similar gain setting may be done for the AF direction.

In the above embodiment, as shown in FIG. 7, the AT gain $\epsilon$ at the reversal time is raised relative to the AT gain $\delta$ at the non-reversal time. This is not absolutely necessary but it is sufficient to cover the vibration around the resonance frequency fp.

In accordance with the present invention, the direction of relative reciprocal movement between the light beam spot and the information track of the optical information recording medium is switched and the tracking servo gain and/or focusing servo gain are also switched so that a minimum required gain is set for each circumstance. Thus, at the non-reversal time, the degradation of the recorded and reproduced signals by the affect of defect or dust on the surface of the recording medium is prevented, and at the reversal time, the off-AT and off-AF are prevented. Accordingly, the reliability and error rate are improved.

Figure 8:
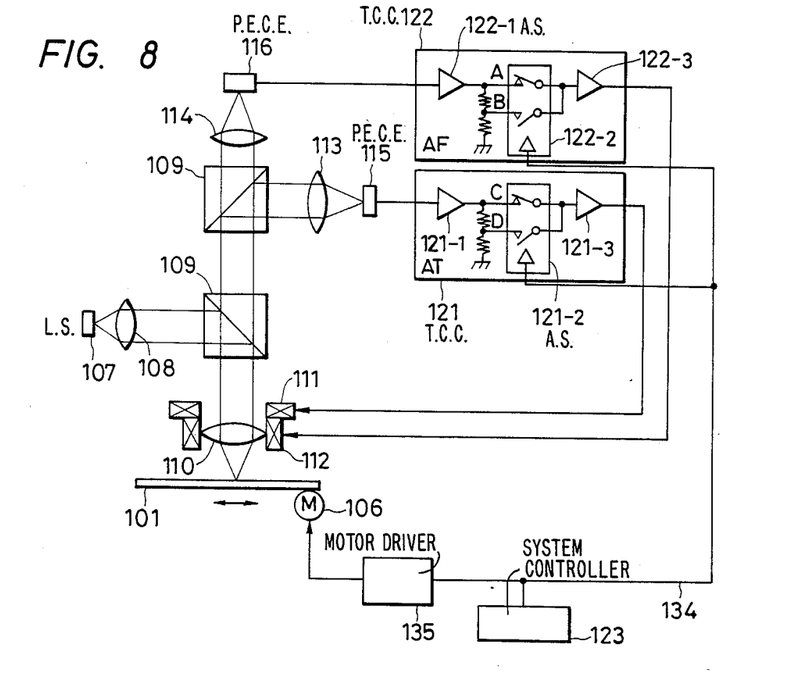
FIG. 8 shows another embodiment of the optical card recording and reproducing apparatus of the present invention.

FIG. 8 shows a configuration of another embodiment of the optical card recording and reproducing apparatus which is the optical information recording and reproducing apparatus of the present invention. The like elements to those shown in FIG. 5 are designated by the like numerals and the explanation thereof is omitted.

In FIG. 8, numeral 123 denotes a system controller which controls the recording and reproducing apparatus, and numeral 134 denotes a record mode/reproduce mode select control signal produced by the controller. The controller 123 also produces signals other than 134 although they are not shown. Numeral 135 denotes a motor driver which receives the signal 134 to set the rotation speed of the motor 106 to the recording or reproducing speed.

The signal 134 is applied to the analog switches 121-1 and 122-2 to control the status of the switches. When the reproduce mode signal 134 is applied, the terminal C of the switch 121-2 is closed and the terminal D is open. In the switch 122-2, the terminal A is closed and the terminal B is open. On the other hand, when the record mode signal 134 is applied, the terminal C of the switch 121-2 is open and the terminal D is closed. In the switch 122-2, the terminal A is open and the terminal B is closed. Accordingly, in the record mode, the output voltages from the amplifiers 121-1 and 122-1 are divided and they are supplied to the drivers 121-3 and 122-3. On the other hand, in the reproduce mode, the output voltages from the amplifiers 121-1 and 122-1 are not divided and supplied to the drivers 121-3 and 122-3, respectively. Thus, the AT gain and AF gain in the record mode may be set lower than those in the reproduce mode.

Figure 9:
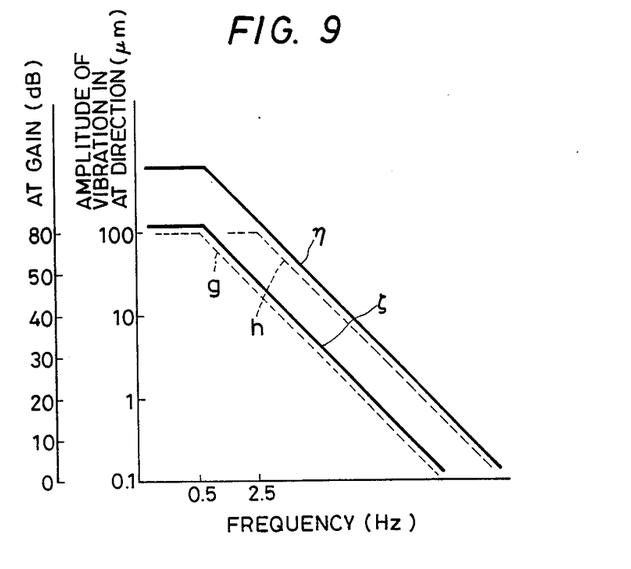

FIG. 9 shows a graph of frequency characteristics of the amplitude of vibration in the AT direction and the AT gain.

In FIG. 9, g represents a vibration in the AT direction in the record mode, and h represents a vibration in the AT direction in the reproduce mode. They are similar to c and d shown in FIG. 4. In the present embodiment, the AT gain in the record mode (that is, when the output of the amplifier 121-1 is applied to the driver 121-3 through the terminal D) is set to assume $\zeta$ of FIG. 9. The $\zeta$ is 60 dB at a frequency below the recording scan frequency 0.5 Hz and decreases at a rate of $-12$ dB/oct at a frequency above the scan frequency. In the reproduce mode, the output of the amplifier 121-1 is applied to the driver 121-3 through the terminal C. Thus, the AT gain assumes $\eta$ of FIG. 9 which is a shift-up version of $\zeta$. By appropriately selecting the resistance between the terminals C and D of FIG. 8 and other constants, the $\zeta$ is 60 dB at the reproducing scan frequency 2.5 Hz and decreases at a rate of $-12$ dB/oct at a frequency above the scan frequency.

Thus, in the record mode, the degradation of the recorded signal due to the oversensitivity by the overgain is prevented, and in the reproduce mode, sufficient AT and AF are attained.

Similar gain setting may be done for the AF direction.

Figure 10:
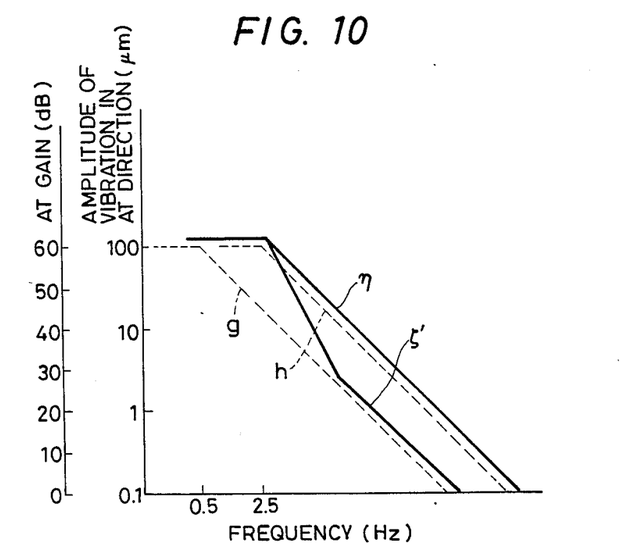

In the above embodiment, as shown in FIG. 9, the AT gain $\zeta$ in the record mode is lower than the AT gain $\eta$ in the reproduce mode. However, this is not absolutely necessary. For example, as shown in FIG. 10, the AT gain in the record mode may be $\zeta'$ which is lower than the AT gain in the reproduce mode only in the high frequency band.

In accordance with the present invention, the speed of the relative reciprocal movement between the light beam spot and the information track of the optical information recording medium is switched, and the tracking servo gain and/or focusing servo gain are switched so that a minimum required gain is set for each circumstance. Accordingly, at the low speed, the degradation of signal by the affect of defect and dust on the surface of the recording medium due to overgain is prevented, and at the high speed, the off-AT and off-AF are prevented. Thus, the reliability and error rate are improved.

In the above two embodiments, the gain is electrically changed. Alternatively, the gain may be changed optically, mechanically or electrically, or by combination thereof, because the AT gain and AF gain are determined by the products of the electrical gain, optical gain and mechanical gain. In order to change the optical gain, the intensity of the light source 107 may be changed, an ND filter may be inserted into a light path, or a variable transmissibility ND filter may be used to change the transmissibility of the filter. In order to change the mechanical gain, the number of turns of the tracking coil 111 may be changed or a distance between the tracking coil 111 and a magnet which is integral with the objective lens 110 may be changed.

What is claimed is:

1. An optical information recording and reproducing apparatus for an optical record medium on which a plurality of tracks are arranged substantially in parallel, comprising:
   a light source for providing a light beam;
   first optical means for guiding the light beam from said light source onto the record medium;
   second optical means for acting on the light beam from the record medium;
   detecting means for receiving the light beam acted on by said second optical means for output at least one of a focussing signal and a tracking signal;
   adjusting means for adjusting at least one of focussing and tracking operations in accordance with at least one of the focussing and tracking signals;
   reciprocating means for providing relative reciprocatory motion between the record medium and the light beam;
   control means for controlling the reciprocating means; and
   switching means for switching at least a servo gain of said adjusting means from a first value to a second value in accordance with at least a signal from said control means.

2. An apparatus according to claim 1, wherein said switching means includes first switch means for switching the servo gain of said adjusting means from the first value to the second value in accordance with a first signal from said control means and second switching means for switching the direction of the reciprocatory motion in accordance with a second signal from said control means.

3. An apparatus according to claim 1, wherein said switching means includes first switching means for switching the servo gain of said adjusting means from the first value to the second value in accordance with a first signal from said control means and second switching means for switching the speed of the reciprocatory motion in accordance with a second signal from said control means.

4. An apparatus according to claim 3, wherein the second value is less than the first value and the second speed is less than the first speed.

5. An apparatus according to claim 3, wherein the second value is greater than the first value and the second speed is greater than the first speed.

6. An apparatus according to claim 1, wherein said switching means switches said servo gain from the first value to the second value to be imparted to a servo mechanism at a predetermined time, the predetermined time occurring during a period for changing a direction of the reciprocatory motion.

7. An apparatus according to claim 1, wherein said switching means switches said servo gain from the first value to the second value to be imparted to a servo mechanism with the reciprocatory motion is switched from a constant speed to a variable speed.

8. An optical information recording and/or reproducing apparatus for an optical information record medium on which a plurality of linear tracks are arranged substantially in parallel, comprising:
   a laser light source for providing a laser light beam;
   a first optical system for guiding the laser light beam from said laser light source onto the record medium;
   a second optical system for acting on the laser light beam from the record medium;
   a photodetector for receiving the laser light beam acted on by said second optical system to output at least one of a focussing signal and a tracking signal;
   a servo mechanism for adjusting at least one of focussing and tracking operations in accordance with at least one of the focussing and tracking signals output by said photodetector;
   a driving mechanism for providing relative reciprocatory motion between the record medium and the laser light beam;
   a control mechanism for controlling the driving mechanism; and
   a circuit for imparting a different servo gain to said servo mechanism for a predetermined time when a direction of the reciprocatory motion is changed.

9. An apparatus according to claim 8, wherein said circuit switches the servo gain of said servo mechanism from a first value to a second value in response to a signal from said control mechanism.

10. An apparatus according to claim 9, wherein said circuit includes a first switch system for switching the servo gain of said servo mechanism from the first value to the second value in response to a first signal from said control mechanism and a second switch system for switching the direction of the reciprocatory motion in response to a second signal from said control mechanism.

11. An apparatus according to claim 9, wherein said circuit includes a first switch system for switching the servo gain of said servo mechanism from the first value to the second value in response to a first signal from said control mechanism and a second switch system for switching the speed of the reciprocatory motion from a first speed to a second speed in response to a second signal from said control mechanism.

12. An apparatus according to claim 11, wherein the second value is less than said first value and the second speed is greater than the first speed.

13. An optical information recording and/or reproducing apparatus for an optical information record medium on which a plurality of linear tracks are arranged substantially in parallel, comprising:
   a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system to output a focussing signal;

a servo mechanism for adjusting focussing operation in accordance with the focussing signal output by said photodetector;

driving mechanism for providing relative reciprocatory motion between the record medium and the laser light beam;

control mechanism for controlling the driving means; and a circuit for imparting a different servo gain to said servo mechanism when the reciprocatory motion is switched from a constant speed to a variable speed.

14. An apparatus according to claim 13, wherein said circuit switches the servo gain of said servo mechanism from a first value to a second value in response to a signal from said control mechanism.

15. An apparatus according to claim 14, wherein said circuit includes a first switch system for switching the servo gain of said servo mechanism from the first value to the second value in response to a first signal from said control mechanism and a second switch system for switching the direction of the reciprocatory motion in response to a second signal from said control mechanism.

16. An apparatus according to claim 14, wherein said circuit includes a first switch system for switching the servo gain of said servo mechanism from the first value to the second value in response t a first signal from said control mechanism and a second switch system for switching the reciprocatory motion from a first speed to a second speed in response to a second signal from said control mechanism.

17. An apparatus according to claim 16, wherein the second value is less than the first value and the second speed is less than the first speed.

18. An apparatus according to claim 16, wherein the second value is greater than the first value and the second speed is greater than the first speed.

19. An optical information recording and/or reproducing apparatus for an optical information record medium on which a plurality of linear tracks are arranged substantially in parallel, comprising:

a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system to output a focussing signal;

a servo mechanism for adjusting focussing operation in accordance with the focussing signal output by said photodetector;

driving mechanism for providing relative reciprocatory motion between the record medium and the laser light beam;

control mechanism for controlling the driving mechanism; and a circuit for imparting a different servo gain to said servo mechanism at a predetermined time, the predetermined time occurring during a period for changing a direction of the reciprocatory motion.

20. An optical information recording and/or reproducing apparatus for an optical information record medium on which a plurality of linear tracks are arranged substantially in parallel, comprising:

a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system to output a focussing signal;

a servo mechanism for adjusting focussing operation in accordance with the focussing signal output by said photodetector;

driving mechanism for providing relative reciprocatory motion between the record medium and the laser light beam;

control mechanism for controlling the driving mechanism; and a circuit for imparting a different servo gain to said servo mechanism when the reciprocatory motion is switched from a constant speed to a variable speed.

21. An optical information recording and/or reproducing apparatus for an optical information record medium on which a plurality of linear tracks are arranged substantially in parallel, comprising:

a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system to output a tracking signal;

a servo mechanism for adjusting tracking operation in accordance with the tracking signal output by said photodetector;

a driving mechanism for providing relative reciprocatory motion between the record medium and the laser light beam;

a control mechanism for controlling the driving mechanism; and a circuit for imparting a different servo gain to said servo mechanism at a predetermined time, the predetermined time occurring during a period for changing a direction of the reciprocatory motion.

22. An optical information recording and/or reproducing apparatus for an optical information record medium on which a plurality of linear tracks are arranged substantially in parallel, comprising:

a laser light source for providing a laser light beam;

a first optical system for guiding the laser light beam from the record medium;

a second optical system for acting on the laser light beam from the record medium;

a photodetector for receiving the laser light beam acted on by said second optical system to output a tracking signal;

a servo mechanism for adjusting tracking operation in accordance with the tracking signal output by said photodetector;

a driving mechanism for providing relative reciprocatory motion between the record medium and the laser light beam;

a control mechanism for controlling the driving mechanism; and a circuit for imparting a different servo gain to said servo mechanism when the reciprocatory motion is switched from a constant speed to a variable speed.

23. An optical information recording and/or reproducing apparatus for an optical information record medium on which a plurality of linear tracks are arranged substantially in parallel, comprising:

a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system;

a servo mechanism for controlling an operation of said first optical system in accordance with a signal output by said photodetector;

a driving mechanism for providing relative reciprocatory motion between the record medium and the laser light beam;

a control mechanism for controlling the driving mechanism; and a circuit for switching a servo gain of said servo mechanism from a first value to a second value at a predetermined time, the predetermined time occurring during a period for changing a direction of the reciprocatory motion.

24. An apparatus according to claim 23, wherein said circuit switches the servo gain of said servo mechanism from the first value to the second value in response to a signal from said control mechanism.

25. An apparatus according to claim 23, wherein said circuit includes a first switch system for switching the servo gain of said servo mechanism from the first value to the second value in response to a first signal from said control mechanism and a second switch system for switching a direction of the reciprocatory motion in response to a second signal from said control mechanism.

26. An apparatus according to claim 23, wherein said circuit includes a first switch for switching the servo gain of said servo mechanism from the first value to the second value in response to a first signal from said control mechanism and a second switch system for switching the reciprocatory motion from a first speed to a second speed in response to a second signal from said control mechanism.

27. An apparatus according to claim 26, wherein the second value is less than the first value and the second speed is less than the first speed.

28. An apparatus according to claim 26, wherein the second value is greater than the first value and the second speed is greater than the first speed.

29. An optical information recording and/or reproducing apparatus for an optical information record medium on which a plurality of linear tracks are arranged substantially in parallel, comprising:

a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system;

a servo mechanism for controlling an operation of said first optical system in accordance with a signal output by said photodetector;

a driving mechanism for providing relative reciprocatory motion between the record medium and the laser light beam;

a control mechanism for controlling the driving mechanism; and a circuit for switching a servo gain of said servo mechanism from a first value to a second value when the reciprocatory motion is switched from a constant speed to a variable speed.

30. An apparatus according to claim 29, wherein said circuit switches the servo gain of said servo mechanism from the first value to the second value in response to a signal from said control mechanism.

31. An apparatus according to claim 29, wherein said circuit includes a first switch system for switching the servo gain of said servo mechanism from the first value to the second value in response to a first signal from said control mechanism and a second switch system for switching a direction of the reciprocatory motion in response to a second signal from said control mechanism.

32. An apparatus according to claim 29, wherein said circuit includes a first switch system for switching the servo gain of said servo mechanism from the first value to the second value in response to a first signal from said control mechanism and a second switch system for switching the reciprocatory motion from a first speed to a second speed in response to a second signal from said control mechanism.

33. An apparatus according to claim 32, wherein the second value is less than the first value and the second speed is less than the first speed.

34. An apparatus according to claim 32, wherein the second value is greater than the first value and the second speed is greater than the first speed.

35. An optical information recording and/or reproducing apparatus for an optical information record medium on which a plurality of linear tracks are arranged substantially in parallel, comprising:

a laser light source for providing a laser light beam;

a first optical system for guiding the laser light beam from said laser light source onto the record medium;

a second optical system for acting on the laser light beam from the record medium;

a photodetector for receiving the laser light beam acted on by said second optical system;

a servo mechanism for controlling an operation of said first optical system in accordance with a signal output by said photodetector;

a driving mechanism for providing relative reciprocatory motion between the record medium and the laser light beam;

a control mechanism for providing relative reciprocatory motion between the record medium and the laser light beam;

a circuit for switching a servo gain to be imparted to said servo mechanism from a first value to a second value at a predetermined time, the predetermined time occurring during a period for changing a direction of the reciprocatory motion.

36. An optical information recording and/or reproducing apparatus for an optical information record medium on which a plurality of linear tracks are arranged substantially in parallel, comprising:
- a laser light source for providing a laser light beam;
- a first optical system for guiding the laser light beam from said laser light source onto the record medium;
- a second optical system for acting on the laser light beam from the record medium;
- a photodetector for receiving the laser light beam acted on by said second optical system;
- a servo mechanism for controlling an operation of said first optical system in accordance with a signal output by said photodetector;
- a driving mechanism for providing relative reciprocatory motion between the record medium and the laser light beam;
- a control mechanism for controlling the driving mechanism; and
- a circuit for switching a servo gain to be imparted to said servo mechanism from a first value to a second value when the reciprocatory motion is switched from a constant speed to a variable speed.

37. A method for recording and/or reproducing information by use of an optical information recording and/or reproducing apparatus for reciprocating an optical information record medium on which a plurality of tracks are arranged substantially in parallel, comprising the steps of:
- converging a light beam from a laser light source for forming a minute spot on the record medium;
- receiving the laser light beam from the record medium for use in controlling tracking and/or focussing of the spot; and
- switching a servo gain of a servo mechanism used for controlling the tracking and/or focussing of the spot from a first value to a second value at a predetermined time, the predetermined time occurring during a period for changing a velocity of the reciprocatory motion.

38. A method for recording and/or reproducing information by use of an optical information recording and/or reproducing apparatus for reciprocating an optical information record medium on which a plurality of tracks are arranged substantially in parallel, comprising the steps of:
- converging a light beam from a laser light source for forming a minute spot on the record medium;
- receiving the laser light beam from the record medium for use in controlling and/or focussing of the spot; and
- switching a servo gain of a servo mechanism used for controlling the tracking and/or focussing of the spot from a first value to a second value at a predetermined time, the predetermined time occurring during a period for changing a direction of the reciprocatory motion.

* * * * *

UNITED STATES PATENT AND TRADEMARK OFFICE
CERTIFICATE OF CORRECTION

PATENT NO. : 4,888,756

DATED : December 19, 1989

INVENTOR(S) : Satoshi Shikichi, et al.

It is certified that error appears in the above-identified patent and that said Letters Patent is hereby corrected as shown below:

IN THE DRAWINGS

FIG. 9, on the AT GAIN (dB) ordinate, "80" should read --60--.

IN THE ABSTRACT

Line 11, "operation" should read --operations--.

IN THE DISCLOSURE

COLUMN 1

Line 33, "note" should read --notes--.

COLUMN 2

Line 2, "them" should read --then--.
Line 43, "ts" should read --fs--.

COLUMN 3

Line 60, "affect of" should read --affects of a--.

UNITED STATES PATENT AND TRADEMARK OFFICE
CERTIFICATE OF CORRECTION

PATENT NO. : 4,888,756

DATED : December 19, 1989

INVENTOR(S) : Satoshi Shikichi, et al.

It is certified that error appears in the above-identified patent and that said Letters Patent is hereby corrected as shown below:

COLUMN 5

Line 25, "nonreversal" should read --non-reversal--.
Line 61, "affect of" should read --affects of a--.

COLUMN 6

Line 49, "$\zeta$" should read --$\eta$--.

COLUMN 7

Line 4, "affect of" should read --affects of a--.
Line 26, "optical record medium" should read --optical information record medium--.

COLUMN 8

Line 13, "with" should read --when--.

COLUMN 9

Line 35, "t" should read --to--.

UNITED STATES PATENT AND TRADEMARK OFFICE
CERTIFICATE OF CORRECTION

PATENT NO. : 4,888,756

DATED : December 19, 1989

INVENTOR(S) : Satoshi Shikichi, et al.

It is certified that error appears in the above-identified patent and that said Letters Patent is hereby corrected as shown below:

COLUMN 10

Line 60, "from" should read --from said laser light source onto--.

COLUMN 11

Line 48, "first switch" should read --first switch system--.

COLUMN 12

Line 63, "beam;" should read --beam; and--.

COLUMN 14

Line 23, "controlling" should read --controlling tracking--.

Signed and Sealed this

Sixteenth Day of April, 1991

Attest:

HARRY F. MANBECK, JR.

*Attesting Officer*     *Commissioner of Patents and Trademarks*